(12) United States Patent
Taka et al.

(10) Patent No.: US 9,064,663 B2
(45) Date of Patent: Jun. 23, 2015

(54) OPERATION INPUT DEVICE

(71) Applicants: Yoichiro Taka, Okazaki (JP); Ryoji Koyama, Kota-cho (JP); Kazuhide Adachi, Okazaki (JP)

(72) Inventors: Yoichiro Taka, Okazaki (JP); Ryoji Koyama, Kota-cho (JP); Kazuhide Adachi, Okazaki (JP)

(73) Assignee: AISIN AW CO., LTD., Aichi-ken (JP)

( * ) Notice: Subject to any disclaimer, the term of this patent is extended or adjusted under 35 U.S.C. 154(b) by 349 days.

(21) Appl. No.: 13/705,954

(22) Filed: Dec. 5, 2012

(65) Prior Publication Data

US 2013/0161164 A1    Jun. 27, 2013

(30) Foreign Application Priority Data

Dec. 27, 2011   (JP) .................. 2011-286486

(51) Int. Cl.
H01L 41/08    (2006.01)
H01H 57/00    (2006.01)
G06F 3/044    (2006.01)
G06F 3/0354   (2013.01)

(52) U.S. Cl.
CPC ............... *H01H 57/00* (2013.01); *G06F 3/044* (2013.01); *G06F 3/03547* (2013.01)

(58) Field of Classification Search
USPC ........................................................ 310/328
See application file for complete search history.

(56) References Cited

U.S. PATENT DOCUMENTS 5,977,888 A  * 11/1999 Fujita et al. .................... 341/34
8,928,621 B2 *  1/2015 Ciesla et al. .................. 345/174

| 2005/0057528 | A1  |  3/2005 | Kleen |
| 2008/0150911 | A1* |  6/2008 | Harrison ........................ 345/173 |
| 2009/0167694 | A1* |  7/2009 | Tan et al. ...................... 345/168 |
| 2009/0256817 | A1* | 10/2009 | Perlin et al. ................... 345/174 |
| 2011/0304550 | A1* | 12/2011 | Romera Jolliff et al. ..... 345/168 |
| 2013/0081933 | A1* |  4/2013 | Browne et al. ................ 200/402 |
| 2013/0162559 | A1* |  6/2013 | Hayatoma et al. ............ 345/173 |
| 2013/0162563 | A1* |  6/2013 | Matsuoka et al. ............ 345/173 |
| 2013/0162564 | A1* |  6/2013 | Adachi et al. ................. 345/173 |
| 2013/0187875 | A1* |  7/2013 | Matsuoka et al. ............ 345/173 |

FOREIGN PATENT DOCUMENTS

| DE | 199 62 552 A1 |  7/2001 |
| JP | 2005-216110 A |  8/2005 |
| JP | 2006-268068 A | 10/2006 |

OTHER PUBLICATIONS

Extended European Search Report, dated Feb. 10, 2014, issued in counterpart European Patent Application No. 12193995.3.

* cited by examiner

Primary Examiner — J. San Martin
(74) Attorney, Agent, or Firm — Sughrue Mion, PLLC

(57) ABSTRACT

An operation input device system and method are provided. The operation input device includes a touch pad having an operation plate on a surface of which an operation surface is formed. The touch pad is configured to sense an object in contact with or in proximity to the operation surface to receive input corresponding to a position of the sensed object. A hole portion provided to penetrate through the operation plate and a protrusion member inserted into the hole portion. The operation input device also includes a drive mechanism provided on a back surface side of the operation plate and configured to cause an advancing/retracting operation of the protrusion member along a direction intersecting the operation surface between a first state in which a distal end portion of the protrusion member is above the operation surface and a second state in which the distal end portion is not above the operation surface.

6 Claims, 9 Drawing Sheets

F I G . 11
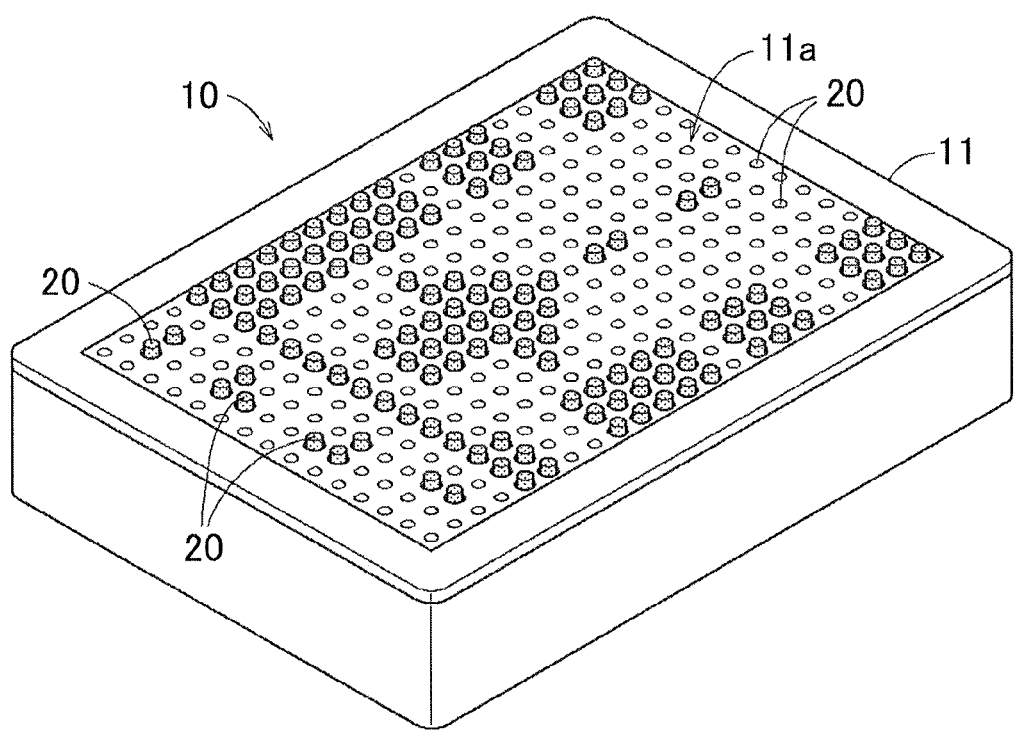

OPERATION INPUT DEVICE

INCORPORATION BY REFERENCE

This application claims priority from Japanese Patent Application No. 2011-286486 filed on Dec. 27, 2011, including the specification, drawings and abstract thereof, the disclosure of which is incorporated herein by reference in its entirety.

BACKGROUND OF THE INVENTION

1. Field of the Invention

Aspects of the present invention relate to an operation input device including a touch pad serving as a pointing device.

2. Description of the Related Art

Devices including an operation input device as standard equipment, are commonly utilized in laptop personal computers etc., for example. The operation input devices may include a touch pad serving as a pointing device. In these types of devices, a user performs various slide operations using their fingertips, the tip of a stylus pen, or the like, on an operation surface provided on an outer surface of the touch pad to move an operation cursor displayed on a display screen, which is communicably connected to the touch pad. In addition, the user may perform a predetermined operation on the operation surface when the operation cursor displayed on the display screen is located over an operation figure (such as an operation icon, for example) to achieve a function associated with the operation figure. These types of operation input devices, which include a touch pad, may be utilized to perform predetermined operational input to in-vehicle navigation apparatuses.

The in-vehicle navigation apparatuses are often operated by a driver of a vehicle. In such a case, the user (a driver of the vehicle) operates the navigation apparatus in when driving. When driving, it is difficult to perform these operations while closely watching the display screen, and thus, a desired operation may not be performed accurately. In view of this, there have been proposed operation input devices that permit a user to perform operation input utilizing tactile sensation (a tactile feel) without requiring the user to closely watch the display screen. For example, Japanese Patent Application Publication No. 2006-268068 (JP 2006-268068 A) discloses a technology by which the entirety of an operation surface is covered with fiber hair, and the fiber hair provided at a position on the operation surface corresponding to the position of an operation figure displayed on a display device is caused to stand up.

In the device according to JP 2006-268068 A, however, the entirety of the operation surface is covered with the fiber hair. Thus, it is difficult to discriminate through tactile sensation between the standing fiber hair and the non-standing fiber hair. Further, the entirety of the operation surface is covered with fiber hair at all times. Thus, an operation performed on the operation surface (such as a slide operation, for example) is not impeded, which makes it difficult to perform operation input to the operation surface of the touch pad accurately. The operation input device according to the related art leaves room for improvement in this regard.

SUMMARY OF THE INVENTION

In view of the foregoing, it is desired to provide an operation input device that provides for tactile sensation without impairing an operational feeling of a touch pad.

According to an aspect of the present invention, there is provided an operation input device including: a touch pad that includes an operation plate on a surface of which an operation surface is formed and is configured to sense an object in contact with or in proximity to the operation surface to receive input corresponding to a position of the sensed object; a hole portion provided to penetrate through the operation plate; a protrusion member inserted into the hole portion; and a drive mechanism provided on a back surface side of the operation plate and configured to cause an advancing/retracting operation of the protrusion member along a direction intersecting the operation surface between a first state in which a distal end portion of the protrusion member is above the operation surface and a second state in which the distal end portion is not above the operation surface.

According to the above configuration, a predetermined operation can be input to another device communicably connected to the operation input device in accordance with the position of the object to be sensed in contact with or in proximity to the operation surface of the touch pad. The hole portion is provided in the operation plate on the surface of the touch pad, and the protrusion member is inserted into the hole portion. The protrusion member is driven by the drive mechanism so as to be advanced and retracted along a direction intersecting the operation surface between the first state and the second state. Therefore, when the protrusion member is in the first state, the distal end portion of the protrusion member is distinctly protruded from the operation surface to provide a user with an operation feeling that utilizes tactile sensation. When the protrusion member is in the second state, the distal end portion of the protrusion member is retracted to the back surface side with respect to the operation plate (or flush with the operation surface), which makes the operation surface of the touch pad flat. Thus, an operation performed on the touch pad by the user is not impeded. That is, by controlling the protrusion member so as to be advanced and retracted between the first state and the second state, it is possible to provide the user with an operation feeling that utilizes tactile sensation without impairing the operation feeling of the touch pad experienced by the user. By bringing the protrusion member positioned at the coordinates on the operation surface corresponding to the coordinates of an operation figure displayed on a display device into the first state, for example, the user may perform operation input to the operation surface at that position in reliance on the protrusion member in the first state. Thus, it is possible to provide an operation input device that enables to perform reliable operation input compared to the related art without closely watching a display screen. Further, by bringing the protrusion member into the second state in the case where an operation figure is not displayed on the display device, for example, the user may smoothly perform operation input to the operation surface without being hindered by the protrusion member.

The touch pad may be a touch pad of a capacitance type, and may include wiring members disposed in a grid along the operation surface; and the hole portion may be provided so as to avoid the wiring members.

According to the above configuration, the distal end portion of the protrusion member can be configured to appear and disappear from the operation surface without impairing the function of the touch pad of the capacitance type even in the case where the conductive wiring members are disposed in a grid along the operation surface of the touch pad in order to sense the object to be sensed.

The drive mechanism may include a piezoelectric element that drives the protrusion member.

According to the above configuration, the protrusion member can be moved by the drive mechanism between the first state and the second state utilizing the characteristics of the piezoelectric element which converts an electric signal into a physical force and vice versa. In addition, providing a configuration that enables to sense an external force applied to the piezoelectric element via the protrusion member as an electric signal may achieve a configuration that enables to sense an operation for the protrusion member performed by the user.

The drive mechanism may include a piezoelectric element configured to vibrate in an advancing/retracting operation direction of the protrusion member, a slide mechanism that enables the piezoelectric element or a member that vibrates together with the piezoelectric element and the protrusion member to slide with respect to each other with a predetermined friction force caused between the piezoelectric element or the member that vibrates together with the piezoelectric element and the protrusion member, and a vibration control section capable of adjusting a difference between a speed of vibration of the piezoelectric element to one side along the advancing/retracting operation direction and a speed of vibration of the piezoelectric element to the other side.

According to the configuration, the piezoelectric element can be vibrated along the advancing/retracting operation direction of the protrusion member to drive the protrusion member along the advancing/retracting operation direction. In this event, the protrusion member can be moved to the protrusion direction side by the vibration control section making the speed of vibration of the piezoelectric element to the protrusion direction side (surface side with respect to the operation surface) lower than the speed of vibration of the piezoelectric element to the side opposite to the protrusion direction side (back surface side with respect to the operation surface), by utilizing a difference between static friction and dynamic friction caused between the piezoelectric element or a member that vibrates together with the piezoelectric element and the protrusion member. Conversely, the protrusion member can be moved to the side opposite to the protrusion direction side by the vibration control section making the speed of vibration of the piezoelectric element to the protrusion direction side higher than the speed of vibration of the piezoelectric element to the side opposite to the protrusion direction side. Hence, the drive mechanism which moves the protrusion member between the first state and the second state can be formed appropriately.

A plurality of the hole portions may be provided, and the protrusion member may be inserted into each of the hole portions.

According to the above configuration, the operation input device is configured to enable to perform operation input at a selected one of a plurality of positions on the operation surface, and can provide an operation feeling that utilizes tactile sensation at each of the plurality of positions.

The operation input device may further include a state sensing section that senses the first state and the second state of the protrusion member.

The state of the protrusion member (the position of the protrusion member in the advancing/retracting operation direction), that is, whether the protrusion member is in the first state or the second state, is primarily decided in accordance with the drive state of the drive mechanism. Meanwhile, the user can forcibly depress the protrusion member to change the state of protrusion. Thus, by providing the state sensing section configured as described above, an operation to depress the protrusion member performed by the user can be determined on the basis of a difference between the state of the protrusion member detected by the state sensing section and the state of the protrusion member derived by the drive mechanism. Hence, predetermined operation input can also be received on the basis of an operation to depress the protrusion member, besides normal operation input performed on the touch pad, for example.

The operation input device which has been described so far may be communicably connected to a display device that includes a display screen and displays an image on the display screen; and coordinates of the display screen and coordinates of the operation surface may be correlated with each other.

According to the above configuration, various operations can be performed appropriately on the image displayed on the display screen on the basis of operation input performed from the operation input device which is peculiar to the aspect of the present invention and which includes a combination of the touch pad and the protrusion member.

BRIEF DESCRIPTION OF THE DRAWINGS

FIG. 11 is a perspective view of a touch pad according to another embodiment.

DETAILED DESCRIPTION OF THE EMBODIMENTS

Figure 1:
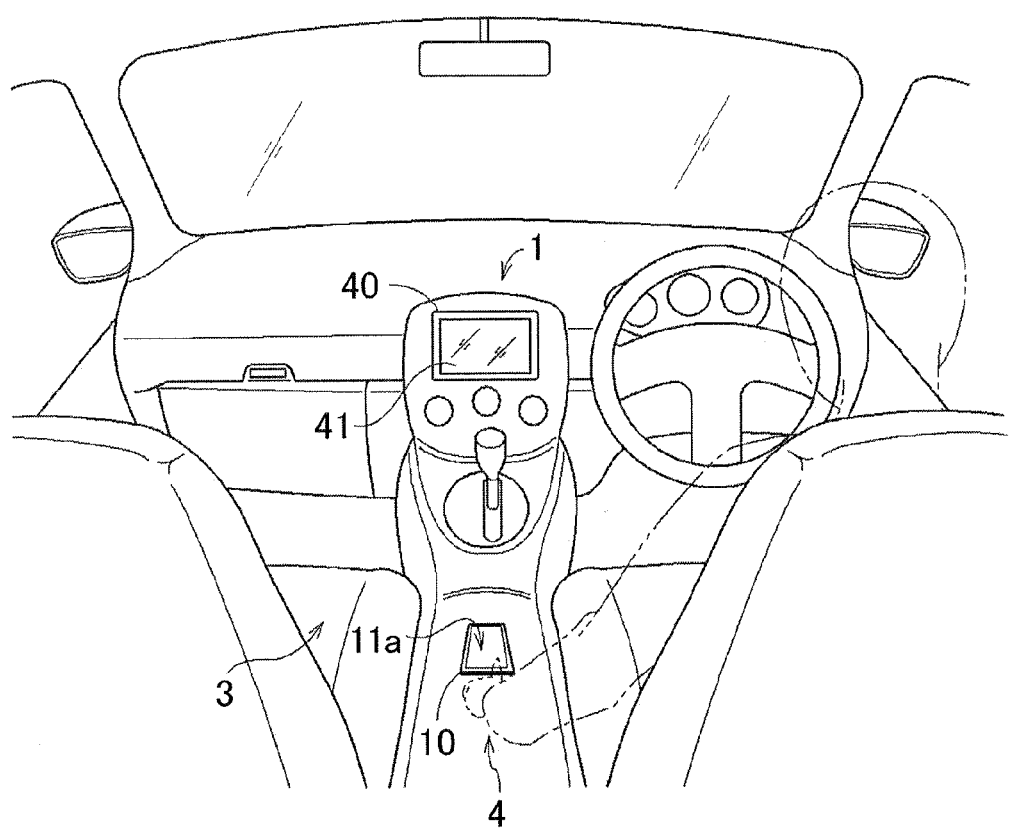
FIG. 1 is a schematic view showing an operation input system as mounted on a vehicle.

An operation input device according to an embodiment of the present invention will be described with reference to the drawings. In the embodiment, an operation input device 4 configured to perform an (predetermined) operation input prescribed in advance to an in-vehicle navigation apparatus 1 (see FIG. 1) is described. The operation input device 4 forms an operation input system 3 together with a display input device 40 communicably connected to the navigation apparatus 1. In the following, a schematic configuration of the navigation apparatus 1, the configuration of the operation input device 4, the configuration of the operation input system 3, and the procedures of an operation input reception process are described below.

1. Schematic Configuration of Navigation Apparatus

A schematic configuration of the navigation apparatus 1 is described with reference to FIGS. 1 and 2. The navigation apparatus 1 is configured to achieve basic functions such as displaying the vehicle position, searching for a route from a departure place to a destination, providing route guidance, and searching for a destination. To this end, the navigation apparatus 1 includes a control computation section 6 as shown in FIG. 2. The control computation section 6 includes an arithmetic processing unit, such as a central processing unit (CPU) as its core member, and may be implemented by hardware, software, or a combination of both as a functional section configured to perform various processes on input data. The control computation section 6 includes a navigation computation section 70. In addition, the control computation section 6 is communicably connected to a Global Positioning System (GPS) receiver 81, an orientation sensor 82, a distance sensor 83, a map database 85, the display input device 40, the touch pad 10, a sound input device 87, and a sound output device 88.

The GPS receiver 81 receives GPS signals from Global Positioning System (GPS) satellites. The orientation sensor 82 detects the orientation of travel of the vehicle or variations in the orientation of travel of the vehicle. The distance sensor 83 detects the vehicle speed and the travel distance of the vehicle. As is known in the related art, the navigation computation section 70 can derive an estimated vehicle position on the basis of information obtained from the GPS receiver 81, the orientation sensor 82, and the distance sensor 83, and further on the basis of map matching.

The map database 85 stores map data divided for each predetermined partition. The map data includes road network data describing the connection relationship between a plurality of nodes corresponding to intersections and a plurality of links corresponding to roads connecting adjacent nodes. Each node has information about its position on the map expressed by latitude and longitude. Each link has information such as the road type, the length of the link, and the road width as its attribute information. The map database 85 is referenced by the navigation computation section 70 during execution of processes such as displaying a map, searching for a route, and map matching. The map database 85 is stored in a storage medium such as a hard disk drive, a flash memory, or a DVD-ROM.

The display input device 40 is formed by integrating a display device such as a liquid crystal display device and an input device such as a touch panel. The display input device 40 includes a display screen 41 which displays a map of an area around the vehicle, images such as an operation figure 44 (see FIG. 6) associated with a predetermined function, and so forth. In the embodiment, the display input device 40 corresponds to the "display device" according to the present invention. The operation figure 44 is a figure displayed on the display screen 41 to make it easy for the user (a passenger of the vehicle) to perceive a particular function to be achieved by operating the touch panel or the touch pad 10 to transfer operation input to the navigation apparatus 1. Examples of the operation figure 44 include operation icons, button images, and character key images depicted as illustrations or the like. The display input device 40 senses an object to be sensed in contact with or in proximity to the touch panel to receive input corresponding to the position of the sensed object. For example, the user may bring the object to be sensed, such as a fingertip or the tip of a stylus pen, in contact with or in proximity to the operation figure 44 displayed on the display screen 41 to select the operation figure 44 and achieve a function associated with the operation figure 44. In addition, the user may bring the object to be sensed in contact with or in proximity to a position other than the operation figure 44 displayed on the display screen 41 to select a location on a map, for example. The display input device 40 functions as a first operation input unit.

Figure 2:
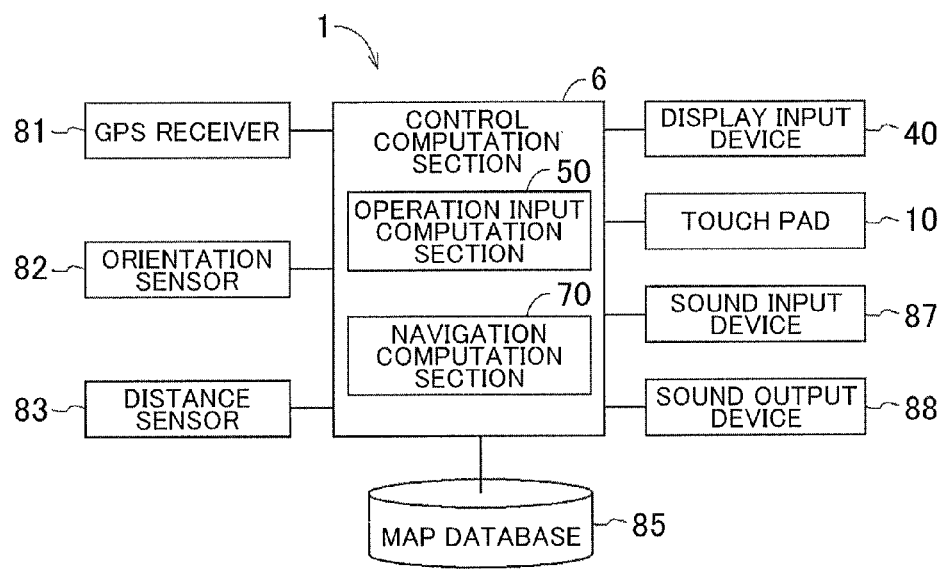
FIG. 2 is a block diagram showing a schematic configuration of a navigation apparatus.

As shown in FIG. 1, the touch pad 10 is provided separately from the display input device 40. The touch pad 10 includes an operation surface 11a, and senses an object to be sensed D (see FIG. 6) in contact with or in proximity to the operation surface 11a to receive input corresponding to the position of the sensed object. An operation cursor 45 (see FIG. 6) is displayed on the display screen 41 in correspondence with the position of the object sensed by the touch pad 10 serving as a pointing device. The user slides the object to be sensed D such as a fingertip in contact with or in proximity to the operation surface 11a to move the operation cursor 45 on the display screen 41. Then, the user may perform a predetermined operation on the operation surface 11a with the operation cursor 45 located over the operation figure 44 to select the operation figure 44 and achieve a function associated with the operation figure 44. In addition, the user may perform a predetermined operation on the operation surface 11a with the operation cursor 45 located over a position other than the operation figure 44 displayed on the display screen 41 to select a location on a map, for example. The touch pad 10 functions as a second operation input unit.

The display input device 40 is disposed at a position at which the display input device 40 may be seen without the need for the user (in particular, the driver of the vehicle) to significantly change his/her viewing direction during drive so as to be easily seeable by the user. In the example shown in FIG. 1, the display input device 40 is disposed at the center portion of the upper surface of a dashboard. However, the display input device 40 may be disposed in an instrument panel, for example. Meanwhile, the touch pad 10 is disposed at a position easily accessible to the hand of the user so as to be easily operable by the user. That is, the touch pad 10 is disposed at a position closer to the hand of the user and farther from the viewing direction than the display input device 40. In the example shown in FIG. 1, the touch pad 10 is disposed at a center console portion. However, the touch pad 10 may be disposed at the center portion of the upper surface of a dashboard, at a spoke portion of a steering wheel, or on a door panel, for example.

The sound input device 87 receives voice input from the user. The sound input device 87 includes a microphone or the like. The navigation computation section 70 may achieve functions such as searching for a destination through voice recognition and making a handsfree call on the basis of voice commands received through the sound input device 87. The sound input device 87 functions as a third operation input unit. The sound output device 88 includes a speaker or the like. The navigation computation section 70 may achieve functions such as providing voice guidance via the sound output device 88.

In the present embodiment, the specific configuration of the touch pad 10 serving as the second operation input unit, among various devices communicably connected to the navigation apparatus 1, has a novel feature in contrast to its counterpart according to the related art. Thus, the configuration of the operation input device 4 formed to include the touch pad 10 and the configuration of the operation input system 3 formed to include the operation input device 4 is described in detail below.

2. Configuration of Operation Input Device

Figure 3:
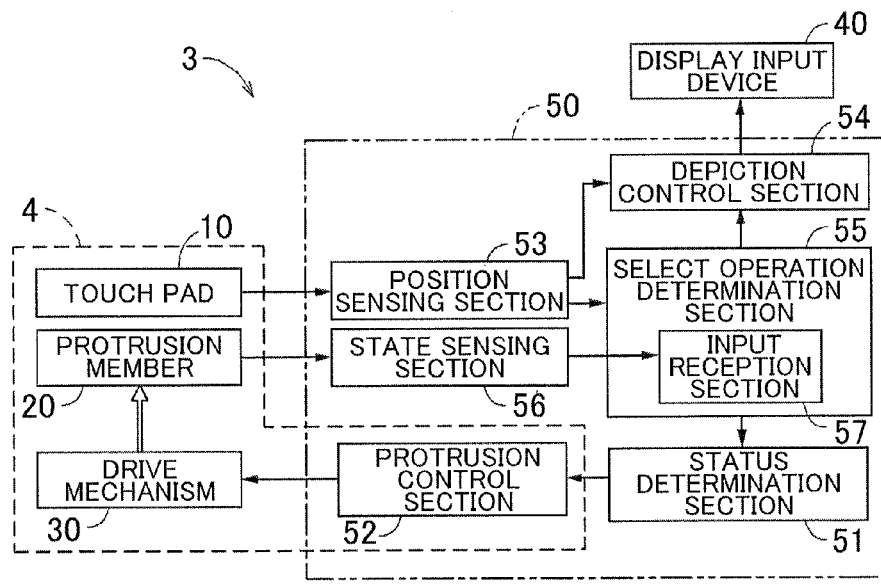
FIG. 3 is a block diagram showing a schematic configuration of the operation input system.
Figure 4:
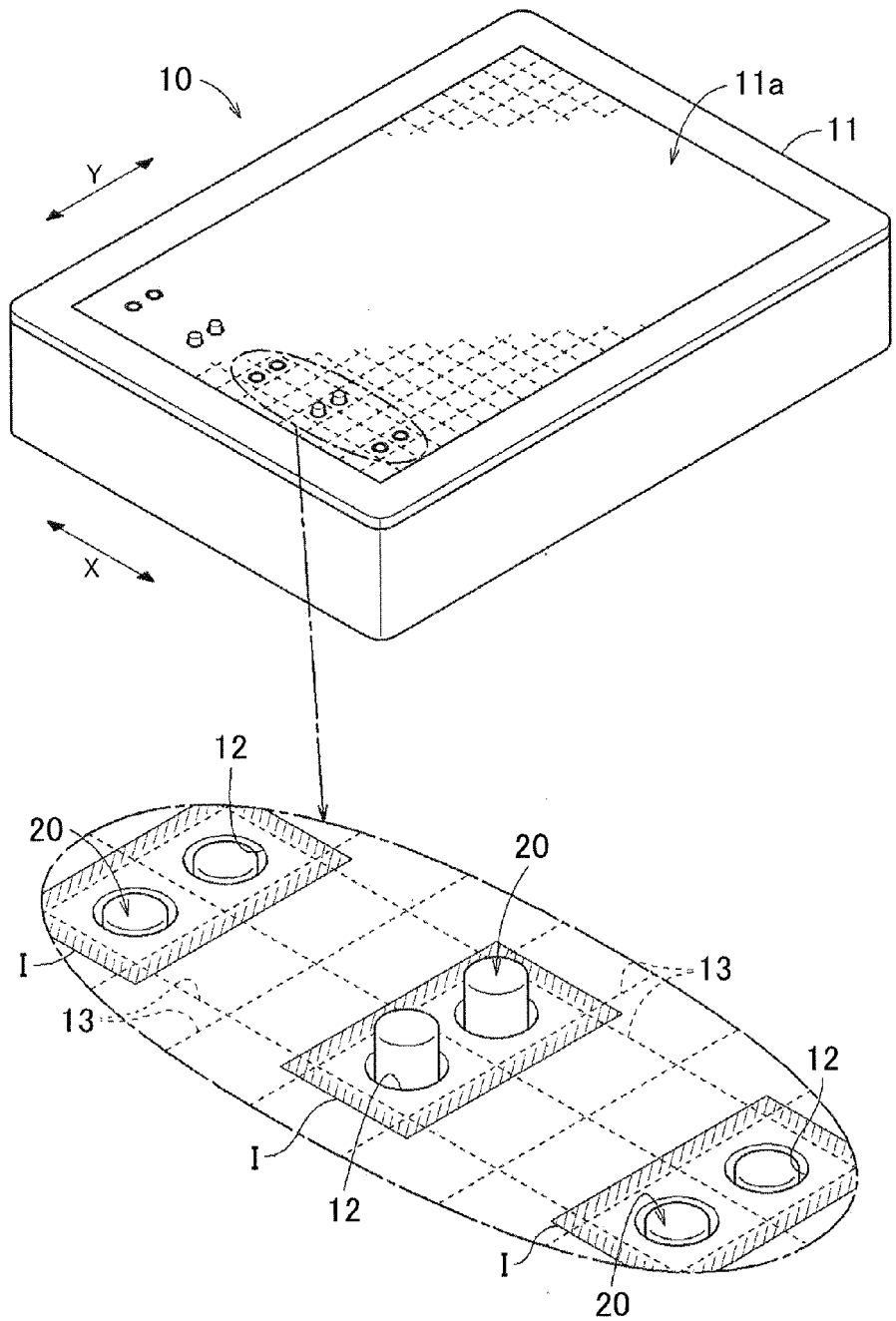
FIG. 4 is a perspective view of a touch pad provided in an operation input device.
Figure 5:
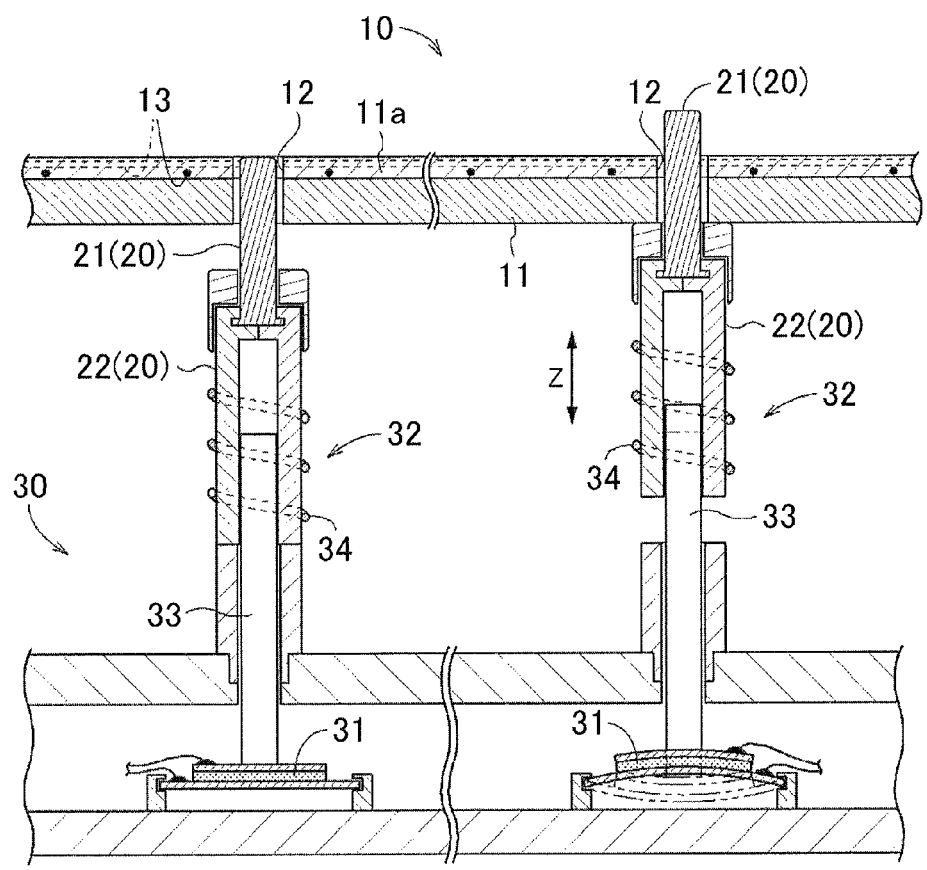
FIG. 5 is a sectional view showing the configuration of a drive mechanism.

As shown in FIGS. 3 to 5, the operation input device 4 includes the touch pad 10, protrusion members 20, and drive mechanisms 30. The operation input device 4 is schematically configured such that the protrusion members 20 driven by the drive mechanisms 30 can protrude and retract (appear and disappear) from the surface of the touch pad 10.

As shown in FIGS. 4 and 5, the touch pad 10 includes an operation plate 11, and the operation surface 11a is formed on the surface of the operation plate 11. The touch pad 10 may be of a variety of types such as a resistance film type and a capacitance type. In this embodiment, the touch pad 10 is of the capacitance type. A substrate and an electrode layer are provided on the back surface side of the operation surface 11a. The touch pad 10 senses the object to be sensed D such as a fingertip in contact with or in proximity to the operation surface 11a to receive input corresponding to the position of the sensed object.

Figure 6:
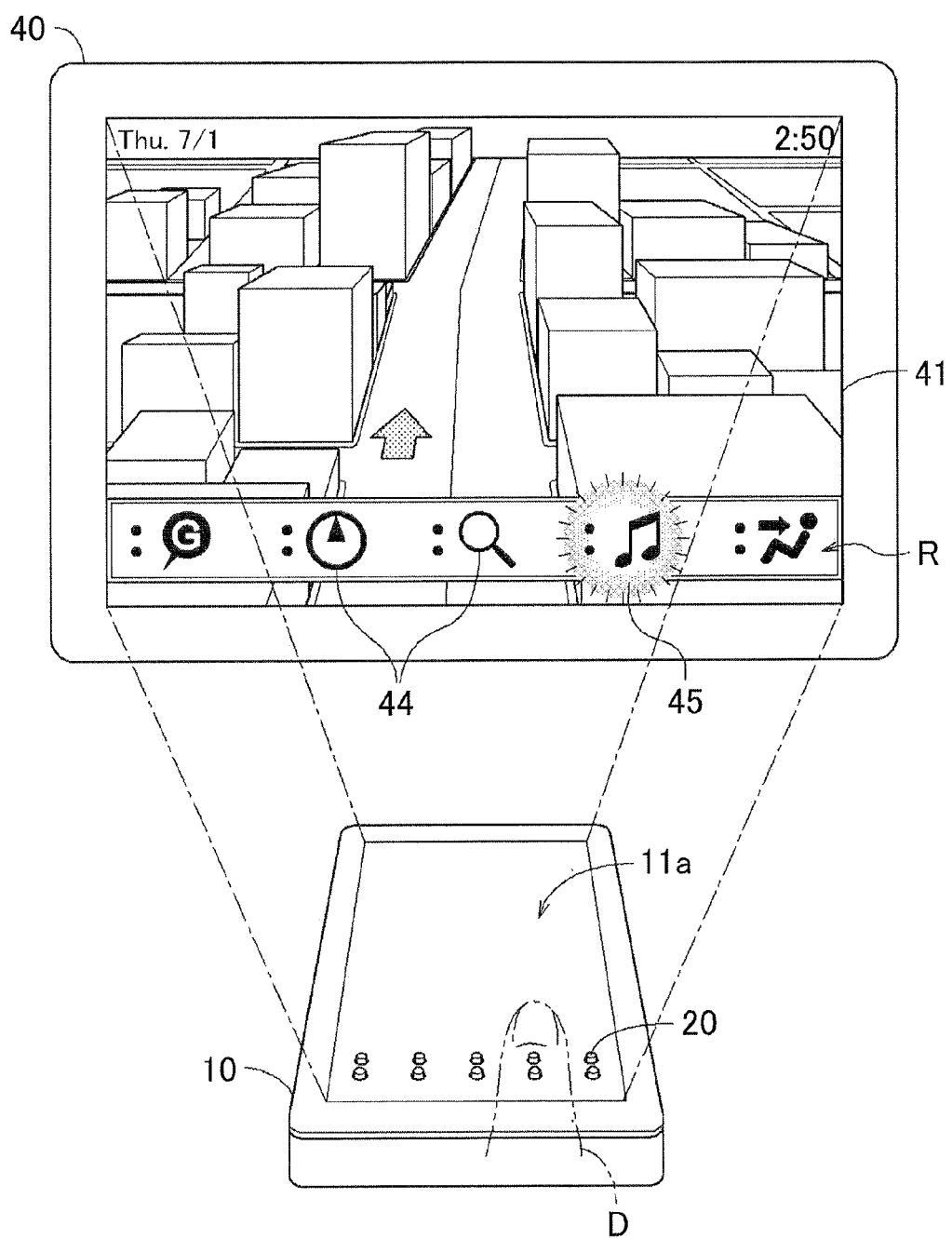
FIG. 6 shows an example of operation input performed utilizing the operation input system.

The operation plate 11 is provided with a hole portion 12 that penetrates through the operation plate 11. In this embodiment, a plurality of (in the example, ten) such hole portions 12 are provided. As shown in FIGS. 4 and 6, two hole portions 12 are arranged along the Y direction of the operation surface 11a, and a total of five pairs of such hole portions 12 are arranged at equal intervals along the X direction of the operation surface 11a. In addition, each of the hole portions 12 is formed to have a circular shape as seen from the surface side of the operation plate 11. Conductive wiring members 13 connected to the electrode layer and provided on the back surface side of the operation surface 11a are disposed in a grid along the operation surface 11a, and each of the hole portions 12 is provided so as to avoid the wiring members 13. That is, each of the hole portions 12 is provided in a rectangular region surrounded by a plurality of wiring members 13 so as not to interfere with any of the wiring members 13. This prevents the function of the touch pad 10 from being impaired by the plurality of hole portions 12 provided in the operation plate 11.

The protrusion member 20 is inserted into each of the hole portions 12. Thus, a plurality of (for example, ten, one for each hole portions 12) protrusion members 20 are also provided. In addition, two protrusion members 20 are arranged along the Y direction of the operation surface 11a, and five pairs of such protrusion members 20 are arranged at equal intervals along the X direction. A region on the touch pad 10 in which the hole portions 12 and the protrusion members 20 are disposed corresponds to a region on the display screen 41 in which an operation figure display region R (see FIG. 6) is disposed.

As shown in FIG. 5, the protrusion member 20 includes a pin member 21 formed in the shape of an elongated circular column (pin) and a tubular member 22 that is generally cylindrical. The diameter of the pin member 21 is slightly smaller than the diameter of the hole portion 12. The tubular member 22 is formed by two semi-cylindrical members obtained by dividing the tubular member 22 into two equal halves along the axial direction of the tubular member 22. The pin member 21 is retained by the tubular member 22 with the lower end portion of the pin member 21 sandwiched between the two semi-cylindrical members. In the embodiment, the distal end portion (upper end portion) of the pin member 21 is inserted into each of the hole portions 12. In a reference state (state on the left side of FIG. 5) in which the protrusion member 20 is not driven by the drive mechanism 30, the distal end portion (distal end surface) of the pin member 21, which is formed to be flat, is positioned to be flush with the level of the operation surface 11a.

As shown in FIG. 5, the drive mechanism 30 is provided on the back surface side with respect to the operation plate 11. The drive mechanism 30 is configured to cause an advancing/retracting operation of the protrusion member 20 along a direction (referred to as "advancing/retracting operation direction Z") intersecting (for example, orthogonally intersecting) the operation surface 11a. The drive mechanism 30 includes a piezoelectric element 31.

The piezoelectric element 31 is a passive element that utilizes a piezoelectric effect, and converts a voltage applied to a piezoelectric body into a force, or converts an external force applied to the piezoelectric body into a voltage. The piezoelectric element 31 is provided to vibrate in the advancing/retracting operation direction Z. A coupling member 33 is coupled to the piezoelectric element 31 to vibrate together with the piezoelectric element 31. The coupling member 33 is formed in the shape of an elongated circular column (pin). The distal end portion of the coupling member 33, on a side opposite to the side on which the coupling member 33 is coupled to the piezoelectric element 31, is inserted into a space inside the tubular member 22. The diameter of the coupling member 33 is substantially equal to the inside diameter of the tubular member 22. The outer peripheral surface of the coupling member 33 and the inner peripheral surface of the tubular member 22 contact each other.

A spring member 34 is provided at a position in which the coupling member 33 and the tubular member 22 contact each other so as to surround the tubular member 22 from the outer peripheral side. The spring member 34 provides an inward preliminary pressure having a predetermined magnitude to cause a predetermined friction force between the coupling member 33 and the tubular member 22 forming the protrusion member 20. The preliminary pressure applied by the spring member 34 is set such that the static friction force between the coupling member 33 and the tubular member 22 is at least larger than a component of a gravitational force acting on the protrusion member 20 in the advancing/retracting operation direction Z. In addition, the preliminary pressure is set such that the coupling member 33 and the tubular member 22 can slide with respect to each other with a dynamic friction force caused between the coupling member 33 and the tubular member 22 along with vibration of the piezoelectric element 31. In the embodiment, a slide mechanism 32 is formed by a slide section formed by the tubular member 22 and the coupling member 33 and the spring member 34 serving as a preliminary pressure application unit.

In addition, a magnitude of the difference between the speed of vibration of the piezoelectric element 31 to one side along the advancing/retracting operation direction Z and the speed of vibration of the piezoelectric element 31 to the other side can be adjusted by a protrusion control section 52 (see FIG. 3) included in an operation input computation section 50 to be discussed later. When the speed of vibration to the protrusion direction side (surface side with respect to the operation surface 11a) is lower than the speed of vibration to the retraction direction side (back surface side with respect to the operation surface 11a), which is opposite to the protrusion direction side, the protrusion member 20 is moved to the protrusion direction side on the basis of the difference between the static friction and the dynamic friction caused between the coupling member 33 and the tubular member 22. This allows the distal end portion of the protrusion member 20 (pin member 21) to be protruded from the surface of the operation surface 11a. That is, the protrusion member 20 may be brought into a state (protruded state) in which the distal end portion of the protrusion member 20 penetrates through the operation plate 11 so as to protrude above the operation surface 11a. The protruded state is a state in which the distal end portion of the protrusion member 20 is above the operation surface 11a along the advancing/retracting operation direction Z, and corresponds to the "first state" according to the present embodiment.

On the other hand, when the speed of vibration to the retraction direction side is lower than the speed of vibration to the protrusion direction side, the protrusion member 20 is moved to the retraction direction side. That is, the protrusion member 20 may be brought into a state (retracted state) in which the distal end portion of the protrusion member 20 is retracted to the back surface side with respect to the operation plate 11. The "retracted state" includes a state in which the distal end portion of the pin member 21 of the protrusion member 20 is flush with the level of the operation surface 11a. That is, the retracted state is a state in which the distal end portion of the protrusion member 20 does not protrude above the operation surface 11a along the advancing/retracting operation direction Z, and corresponds to the "second state" according to the present embodiment.

In the embodiment, the drive mechanism 30 is formed by the piezoelectric element 31, the slide mechanism 32, and the protrusion control section 52 included in the operation input computation section 50. In FIG. 3, for convenience, the protrusion control section 52 is shown separately from the drive mechanism 30. The plurality of protrusion members 20 can be independently moved between the protruded state and the retracted state by the drive mechanism 30. Accordingly, the operation input device 4 according to this embodiment includes a combination of the touch pad 10 and the plurality of protrusion members 20 provided so as to freely appear and disappear from the operation surface 11a of the touch pad 10.

A configuration including a combination of the touch pad 10 of the capacitance type and the drive mechanism 30 which uses the piezoelectric element 31 as in the embodiment is particularly preferable. The touch pad 10 of the capacitance type detects the position of the object to be sensed D on the operation surface 11a on the basis of variations in capacitance between the operation surface 11a and the object to be sensed D such as a fingertip of the user. In the case where the touch pad 10 of the capacitance type is provided and the drive mechanism 30 which uses an actuator other than the piezoelectric element 31 (such as a motor or a solenoid, for example), noise can be caused along with drive of the actuator which may vary the capacitance. As a result, the accuracy in detecting the position of the object to be sensed D on the touch pad 10 can be reduced. By contrast, if the actuator of the drive mechanism 30 is a piezoelectric element 31 as in the embodiment, noise caused by driving the actuator is suppressed to be very low. Therefore, the accuracy in detecting the position of the object to be sensed D on the touch pad 10 may be maintained at a high level even if the touch pad 10 is of the capacitance type.

3. Configuration of Operation Input System

As shown in FIG. 3, the operation input system 3 includes the operation input device 4 discussed above, the display input device 40, and the operation input computation section 50 interposed between the operation input device 4 and the display input device 40. In the embodiment, the operation input computation section 50 is incorporated in the control computation section 6 forming the navigation apparatus 1 (see FIG. 2). It should be noted, however, that the present invention is not limited to such a configuration, and that the operation input computation section 50 may be provided independently of the control computation section 6. The operation input device 4 and the display input device 40 are communicably connected to each other via the operation input computation section 50.

The operation input computation section 50 includes a status determination section 51, the protrusion control section 52, a position sensing section 53, a depiction control section 54, and a select operation determination section 55. In the embodiment, in addition, the operation input computation section 50 further includes a state sensing section 56 and an input reception section 57.

The status determination section 51 determines a protrusion status representing the state of protrusion of each of the protrusion members 20 in accordance with the image content displayed on the display screen 41. In the embodiment, the protrusion status includes the "protruded state" and the "retracted state". The "retracted state" as one type of the protrusion status is a state in which the protrusion member 20 is at the minimally displaced position within its movable range in the advancing/retracting operation direction Z (with the distal end portion of the pin member 21 flush with the level of the operation surface 11a). The "protruded state" as the other type of the protrusion status is a state in which the protrusion member 20 is at the maximally displaced position within its movable range in the advancing/retracting operation direction Z. In the embodiment, the status determination section 51 determines which one of the protruded state and the retracted state each of the protrusion members 20 is brought into.

As discussed above, the display screen 41 may display an image of the operation figure 44 associated with a predetermined function besides a map image of an area around the vehicle position. For example, as shown in FIG. 6, images of five operation figures 44 are displayed side by side in a horizontal row at equal intervals in the operation figure display region R set on the lower side on the display screen 41, and superimposed on the map image of the area around the vehicle position. These operation figures 44 correspond to main functions for operating the navigation apparatus 1 and various accessories of the vehicle. For example, the operation figures 44 are associated with a probe traffic information display function, a vehicle position display function, a destination search function, an audio setting function, and an air conditioner setting function, sequentially in this order from the left. In this embodiment, images of a maximum of five operation figures 44, for example, may be displayed in the operation figure display region R.

The status determination section 51 correlates the coordinates of the display screen 41 and the coordinates of the operation surface 11a, and determines that the protrusion status of one or more protrusion members 20 positioned at the coordinates on the operation surface 11a corresponding to the coordinates on the display screen 41 of the operation figure 44 being displayed is the protruded state. In the embodiment, the status determination section 51 determines that the protrusion status of each of a pair of (two) protrusion members 20 arranged in the Y direction for one displayed operation figure 44 is the protruded state. On the other hand, the status determination section 51 determines that the protrusion status of the protrusion members 20 positioned at the coordinates on the operation surface 11a corresponding to the coordinates on the display screen 41 of a region in which the operation figure 44 is not displayed is the retracted state. In the example of FIG. 6, images of five operation figures 44 are displayed in the operation figure display region R, five being the upper limit number of displayable operation figures 44. Thus, it is determined that the protrusion status of all the ten protrusion members 20 is the protruded state.

In the case where the image displayed on the display screen 41 is changed, the status determination section 51 determines a difference between the protrusion status corresponding to the image before the change and the protrusion status corresponding to the image after the change for each of the protrusion members 20. The status determination section 51 determines which one of "not changed", "transitioned to the protruded state", and "transitioned to the retracted state" is applied to each of the protrusion members 20. In the case where the operation figure 44 associated with the audio setting function is selected in FIG. 6, switching is made to a screen including images of two operation figures 44 for volume adjustment as shown by way of example in FIG. 7. In this case, among the five operation figures 44 displayed side by side, two at both ends and one at the center disappear (retract), and the remaining two are maintained on display although the images are changed. Thus, in such a case, for example, the status determination section 51 determines that the protrusion status of each pair of (every two) protrusion members 20 arranged in the Y direction is "transitioned to the retracted state", "not changed", "transitioned to the retracted state", "not changed", and "transitioned to the retracted state", sequentially in this order along the Y direction.

The status determination section 51 outputs information on the protrusion status, or the difference in protrusion status, determined for each of the protrusion members 20 to the protrusion control section 52.

The protrusion control section 52 controls the position of the protrusion member 20 with respect to the operation surface 11a in the protrusion direction (which coincides with the advancing/retracting operation direction Z). The protrusion control section 52 controls the drive mechanism 30 on the basis of the information received from the status determination section 51. In the embodiment, the protrusion control section 52 vibrates the piezoelectric element 31 by applying a pulsed voltage. The protrusion control section 52 is configured to adjust the difference between the speed of vibration to one side along the advancing/retracting operation direction Z and the speed of vibration to the other side. Such a configuration may be achieved by changing the duty ratio in accordance with the direction of vibration of the piezoelectric element 31. The protrusion control section 52 moves the protrusion member 20 to the protrusion direction side by making the speed of vibration to the protrusion direction side lower than the speed of vibration to the retraction direction side. On the other hand, the protrusion control section 52 moves the protrusion member 20 to the retraction direction side by making the speed of vibration to the retraction direction side lower than the speed of vibration to the protrusion direction side. In the embodiment, the protrusion control section 52 corresponds to the "vibration control section" according to the present embodiment.

As discussed above, the results of the determination performed by the status determination section 51 are based on whether or not the operation figure 44 is displayed at a predetermined position of the display screen 41. Therefore, in the case where a particular operation figure 44 is displayed on the display screen 41, the protrusion control section 52 brings the protrusion member 20 positioned at the coordinates on the operation surface 11a corresponding to the coordinates of the operation figure 44 into the protruded state (see FIGS. 6 and 7) by controlling the drive mechanism 30 on the basis of the determination results. In the embodiment, a pair of (two) protrusion members 20 are brought into the protruded state for one operation figure 44. That is, the protrusion control section 52 expresses each operation figure 44 in the form of two protrusion portions arranged side by side in the Y direction of the operation surface 11a.

Figure 7:
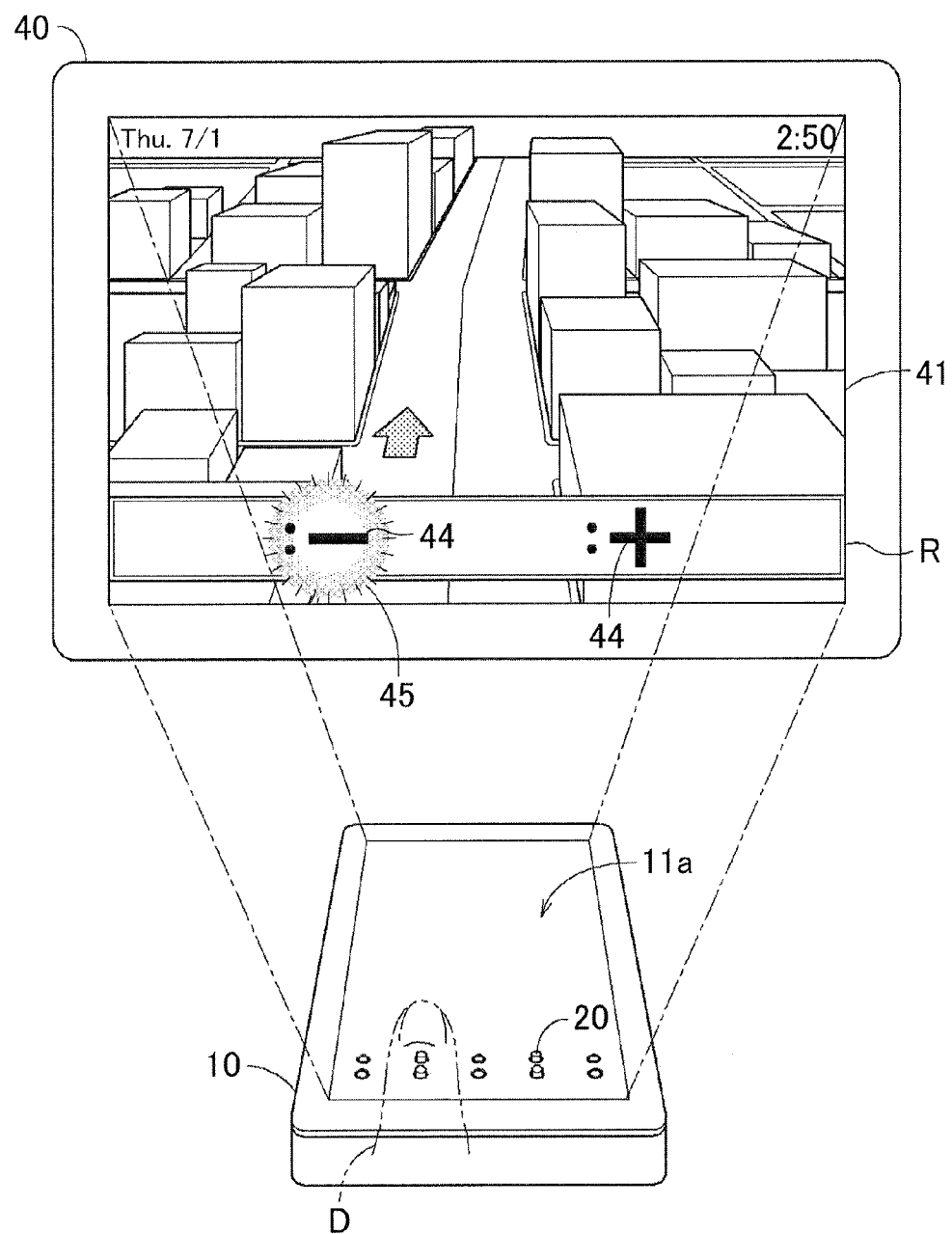
FIG. 7 shows an example of operation input performed utilizing the operation input system.

In addition, the protrusion control section 52 brings the protrusion members 20 positioned at the coordinates on the operation surface 11a corresponding to the coordinates on the display screen 41 of a region in which the operation figure 44 is not displayed into the retracted state (see FIG. 7). In this way, the protrusion control section 52 brings only the protrusion members 20 corresponding to a particular operation figure 44 displayed on the display screen 41 into the protruded state. In the case where the results of the determination performed by the status determination section 51 is obtained as the difference in protrusion status, the protrusion control section 52 maintains each of the protrusion members 20 in the protruded state or the retracted state, or switches each of the protrusion members 20 between the protruded state and the retracted state, on the basis of the determination results.

The protrusion control section 52 vibrates the piezoelectric element 31 for a predetermined time longer than the time required to switch the protrusion member 20 between the protruded state and the retracted state, and thereafter stops the vibration. That is, a voltage is applied to the piezoelectric element 31 only for the predetermined time, and thereafter application of the voltage is stopped. Even after application of the voltage is stopped, the protrusion member 20 maintains its position in the advancing/retracting operation direction Z through static friction between the coupling member 33 and the tubular member 22.

Figure 8:
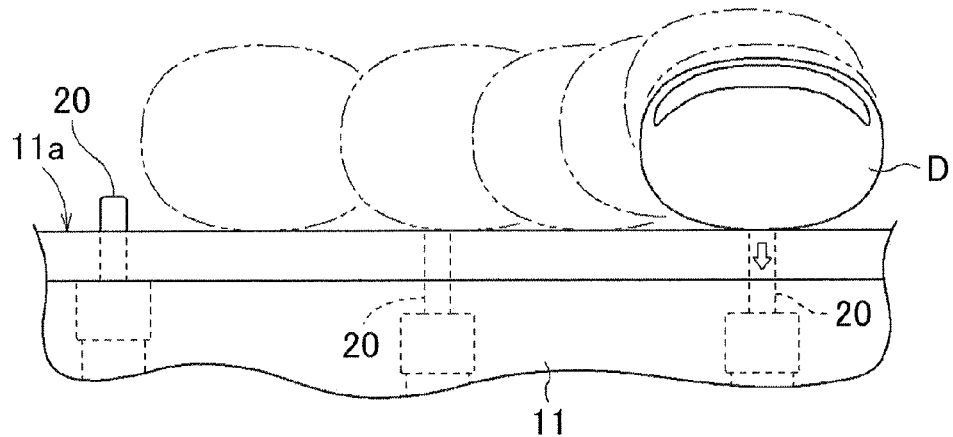
FIG. 8 shows an example of operation input performed utilizing the operation input system.

In the embodiment, the protrusion height of the protrusion member 20 which is brought into the protruded state (height of the distal end portion of the protrusion member 20 with reference to the operation surface 11a) is set to be relatively small. In the case where the object to be sensed D is a fingertip of the user as shown in FIG. 8, for example, the protrusion height may be so small that the difference in height can be absorbed by the flexibility of the ball of a finger intrinsic to a living body when the user slides his/her finger along the operation surface 11a. For example, the protrusion height may be equal to or less than 20% of the thickness of a fingertip. As a matter of course, the protrusion height may be more than that.

The position sensing section 53 acquires a sensed position of the object to be sensed D on the operation surface 11a of the touch pad 10. The position sensing section 53 specifies the position of an electrode most proximal to the object to be sensed D on the basis of variations in capacitance of the electrodes caused when the object to be sensed D such as a fingertip is brought into contact with or into proximity to the operation surface 11a. Then, the position sensing section 53 acquires the specified position of the electrode as the sensed position on the operation surface 11a. The touch pad 10 may receive input corresponding to the sensed position on the operation surface 11a through such a function of the position sensing section 53. The position sensing section 53 outputs information on the acquired sensed position to the depiction control section 54 and the select operation determination section 55.

The depiction control section 54 controls depiction of an image to be displayed on the display screen 41. The depiction control section 54 generates a plurality of layers containing images of a background, roads, names of places, etc., around the vehicle position. In addition, the depiction control section 54 generates a layer containing an image of a vehicle position mark representing the vehicle position, and a layer containing an image of a route for guidance to a destination in the case where such a destination is set. Further, the depiction control section 54 generates a layer containing images of the predetermined operation figures 44, and a layer containing an image of the predetermined operation cursor 45. Then, the depiction control section 54 superimposes the generated layers to generate a single display image, and causes the display screen 41 to display the generated image.

The depiction control section 54 causes the main operation figures 44 to be displayed in the operation figure display region R set in the display screen 41 (see FIG. 6). The types of the operation figures 44 to be displayed may differ depending on a request from the user, the running state of the vehicle, or the like. The depiction control section 54 appropriately displays and hides the various types of the operation figures 44 depending on the situation.

In addition, the depiction control section 54 appropriately displays and hides the operation cursor 45 in accordance with a request from the user. In the embodiment, in the case where the position sensing section 53 does not sense contact of the object to be sensed D with or proximity of the object to be sensed D to the operation surface 11a, the depiction control section 54 hides the operation cursor 45. On the other hand, in the case where the position sensing section 53 senses contact of the object to be sensed D with or proximity of the object to be sensed D to the operation surface 11a, the depiction control section 54 displays the operation cursor 45, which has a circular shape in the example, at a position on the display screen 41 corresponding to the sensed position on the operation surface 11a. In the example, the operation cursor 45 is displayed such that the sensed position and the center position of the operation cursor 45 coincide with each other. In the case where the object to be sensed D in contact with or in proximity to the operation surface 11a is slid and the sensed position is also slid, the operation cursor 45 being displayed is also moved on the display screen 41 synchronously.

The select operation determination section 55 determines whether or not a select operation is performed for the operation figure 44 displayed on the display screen 41. The select operation determination section 55 determines whether or not a select operation is performed for the operation figure 44 on the basis of a predetermined operation performed on the operation surface 11a. In addition, in the case where the predetermined operation is sensed in a predetermined region including the position of the protrusion members 20 in the protruded state also on the basis of the position of the protrusion members 20, the select operation determination section 55 determines that a select operation for the operation figure 44 corresponding to the protrusion members 20 has been performed.

In the embodiment, two protrusion members 20 are assigned to one operation figure 44, and the pair of (two) protrusion members 20 have the same protrusion status at all times. Thus, one operation figure assignment region I (see FIG. 4) containing the positions of the pair of (two) protrusion members 20 is set as the "predetermined region" for the pair of (two) protrusion members 20. It should be noted that operation figure assignment regions I corresponding to pairs of protrusion members 20 that are adjacent in the X direction are set so as not to overlap each other. Examples of the "predetermined operation" for determination include an operation of bringing the object to be sensed D, which has not been in contact with the operation surface 11a, into contact with the operation surface 11a (touch operation), an operation of temporarily moving the object to be sensed D, which has been in contact with the operation surface 11a, away from the operation surface 11a and thereafter bringing the object to be sensed D into contact with the operation surface 11a again (tap operation), and an operation of performing two tap operations within a predetermined time (double-tap operation).

In the embodiment, the coordinates of the display screen 41 and the coordinates of the operation surface 11a are correlated with each other as discussed above, and only the protrusion members 20 corresponding to a particular operation figure 44 displayed on the display screen 41 are brought into the protruded state. When the protrusion members 20 are in the retracted state, a portion of the operation surface 11a around the protrusion members 20 is flat. When the protrusion members 20 are in the protruded state, in contrast, the distal end portions of the protrusion members 20 are distinctly protruded from the operation surface 11a to provide the user with an operation feeling that utilizes tactile sensation. This allows the user to directly recognize the difference in height through tactile sensation using a fingertip or the like. In addition, the user may easily associate the position of the protrusion member 20 on the operation surface 11a recognized through tactile sensation and the position of the operation figure 44 displayed on the display screen 41 with each other through comparison performed in his/her mind. The user may further perform a touch operation or the like at a desired position on the operation surface 11a in reliance on the protrusion member 20 recognized through tactile sensation at that position. This allows the user to easily select the desired operation figure 44 without seeing the touch pad 10 provided close to the hand of the user as a matter of course, or even with hardly seeing the display input device 40 provided at a position close to the viewing direction when driving. Thus, the operation input device 4 and the operation input system 3 according to the embodiment allow a user to perform a reliable operation input compared to the related art without closely watching the display screen 41.

In the embodiment, in addition, when the protrusion members 20 are in the retracted state, the distal end portions of the protrusion members 20 are flush with the operation surface 11a of the touch pad 10, which makes the operation surface 11a flat. Thus, an operation performed on the touch pad 10 by the user is not impeded. Hence, by bringing the protrusion members 20 into the retracted state in the case where the operation figures 44 are not displayed on the display screen 41 as in the embodiment, the user may smoothly perform operation input to the operation surface 11a without being hindered by the protrusion members 20. By controlling the protrusion members 20 so as to be advanced and retracted between the protruded state and the retracted state as described above, it is possible to provide an operation feeling that utilizes tactile sensation without impairing the operation feeling of the touch pad 10.

In the embodiment, in addition, each of the operation figures 44 displayed on the display screen 41 is expressed by a pair of (two) protrusion members 20 in the form of two protrusion portions arranged side by side. Therefore, the user may easily grasp the position of the operation figure assignment region I on the operation surface 11a by recognizing the two points at the same location through tactile sensation. In addition, the configuration of the drive mechanism 30 can be advantageously relatively simplified without increasing the number of protrusion members 20 more than necessary.

In the case where it is determined that a select operation for the operation figure 44 has been performed, the select operation determination section 55 outputs information representing the select operation to the navigation computation section 70 to achieve a function associated with the selected operation figure 44. The select operation determination section 55 also outputs the information to the status determination section 51 and the depiction control section 54. Thus, in the case where the image displayed on the display screen 41 is changed in accordance with the function to be achieved next, the display image is updated, and the difference in protrusion status of each protrusion member 20 is determined accordingly.

The state sensing section 56 senses the protruded state and the retracted state of the protrusion members 20. The state sensing section 56 is configured to acquire information from a position sensor (not shown), for example. The state sensing section 56 senses whether the actual protrusion status of each protrusion member 20 is the protruded state or the retracted state on the basis of the acquired information on the position of the protrusion member 20 in the advancing/retracting operation direction Z. The state sensing section 56 outputs information on the sensing results to the input reception section 57 of the select operation determination section 55.

In the case where the state sensing section 56 senses that the protrusion member 20 has been changed from the protruded state to the retracted state, the input reception section 57 receives input to the protrusion member 20. In the embodiment, as described above, the protrusion members 20 corresponding to a particular operation figure 44 displayed on the display screen 41 have been brought into the protruded state. Therefore, receiving input to the protrusion member 20 is equivalent to receiving input to the operation figure 44 corresponding to the protrusion member 20. That is, in the case where it is sensed that the protrusion member 20 has been changed from the protruded state to the retracted state, the input reception section 57 receives input to the operation figure 44 corresponding to the protrusion member 20. The select operation determination section 55 determines on the basis of the received input that a select operation has been performed for the operation figure 44 corresponding to the protrusion member 20.

In the embodiment, in which the input reception section 57 is provided, a select operation for the operation figure 44 may be received via the protrusion member 20, besides a normal select operation received on the basis of a touch operation or the like on the touch pad 10. In this event, the user may select the desired operation figure 44 just by recognizing through tactile sensation a target protrusion member 20 in the protruded state through a slide operation performed on the operation surface 11a using the object to be sensed D, such as a fingertip, and thereafter depressing the protrusion member 20 into the retracted state as shown in FIG. 8. That is, the user may select the operation figure 44 through an intuitive operation of taking the protrusion member 20 in the protruded state as a button and depressing the simulated button. Thus, the operation input device 4 and the operation input system 3 according to the embodiment allow to perform operation input in a highly convenient manner.

In the example of a display image switching process described with reference to FIGS. 6 and 7, in the case where the operation figure 44 associated with the audio setting function is selected through a predetermined operation (for example, a double-tap operation) performed on the operation surface 11a of the touch pad 10, only switching is made to a screen including images of two operation figures 44 for volume adjustment (see FIG. 7). In the case where the operation figure 44 associated with the audio setting function is selected through a depression operation performed on the protrusion member 22, meanwhile, screen switching is made in the same manner as described above, and the protrusion member 20 which has been brought into the retracted state through the depression operation is transitioned to the protruded state again.

4. Process Procedures of Operation Input Reception Process

The process procedures of the operation input reception process performed by the operation input system 3 according to the embodiment will be described with reference to FIGS. 9 and 10. The procedures of the operation input reception process described below are executed by hardware or software (a program) implementing the functional sections of the operation input computation section 50, or a combination of both. In the case where the functional sections are implemented by a program, the arithmetic processing unit provided in the control computation section 6 including the operation input computation section 50 operates as a computer that executes the program implementing the functional sections.

Figure 9:
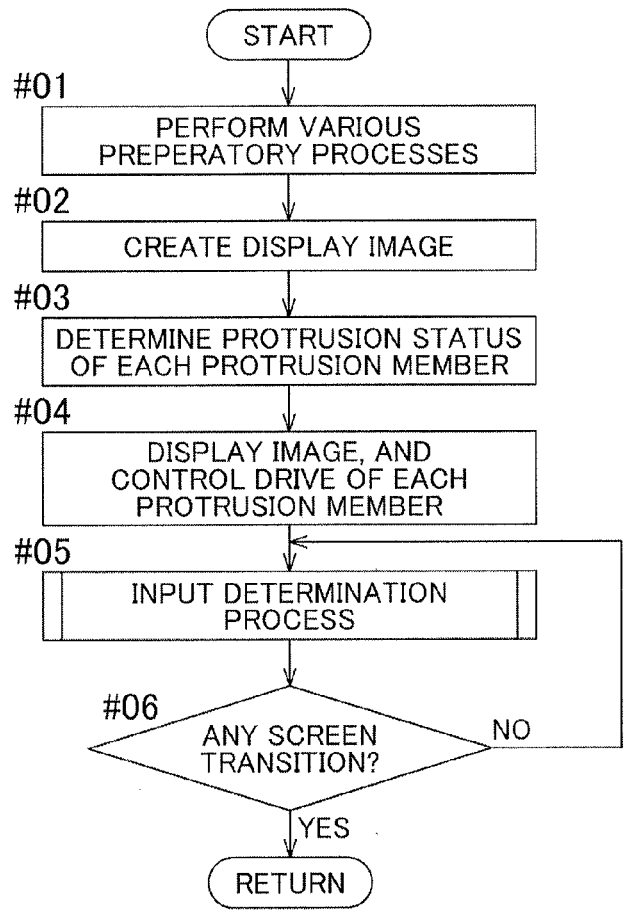
FIG. 9 is a flowchart showing the overall process procedures of an operation input reception process.

In the operation input reception process, as shown in FIG. 9, first, various preparatory processes are executed (step #01). Examples of the preparatory processes include preparing a work area for creating a display image. Next, a display image is actually created (step #02). The protrusion status of each protrusion member 20 is determined (step #03). The determination results are set in the form of ON/OFF, for example. Next, an image is displayed on the display screen 41 and the drive mechanism 30 drives the protrusion member 20 so as to be advanced and retracted (step #04) on the basis of the display image created in step #02 and the protrusion status determined in step #03. This causes the protrusion members 20 corresponding to a particular operation figure 44 displayed on the display screen 41 to be brought into the protruded state. The protrusion members 20 corresponding to the operation figures 44 which are not displayed are brought into the retracted state. An input determination process is executed in this state (step #05).

Figure 10:
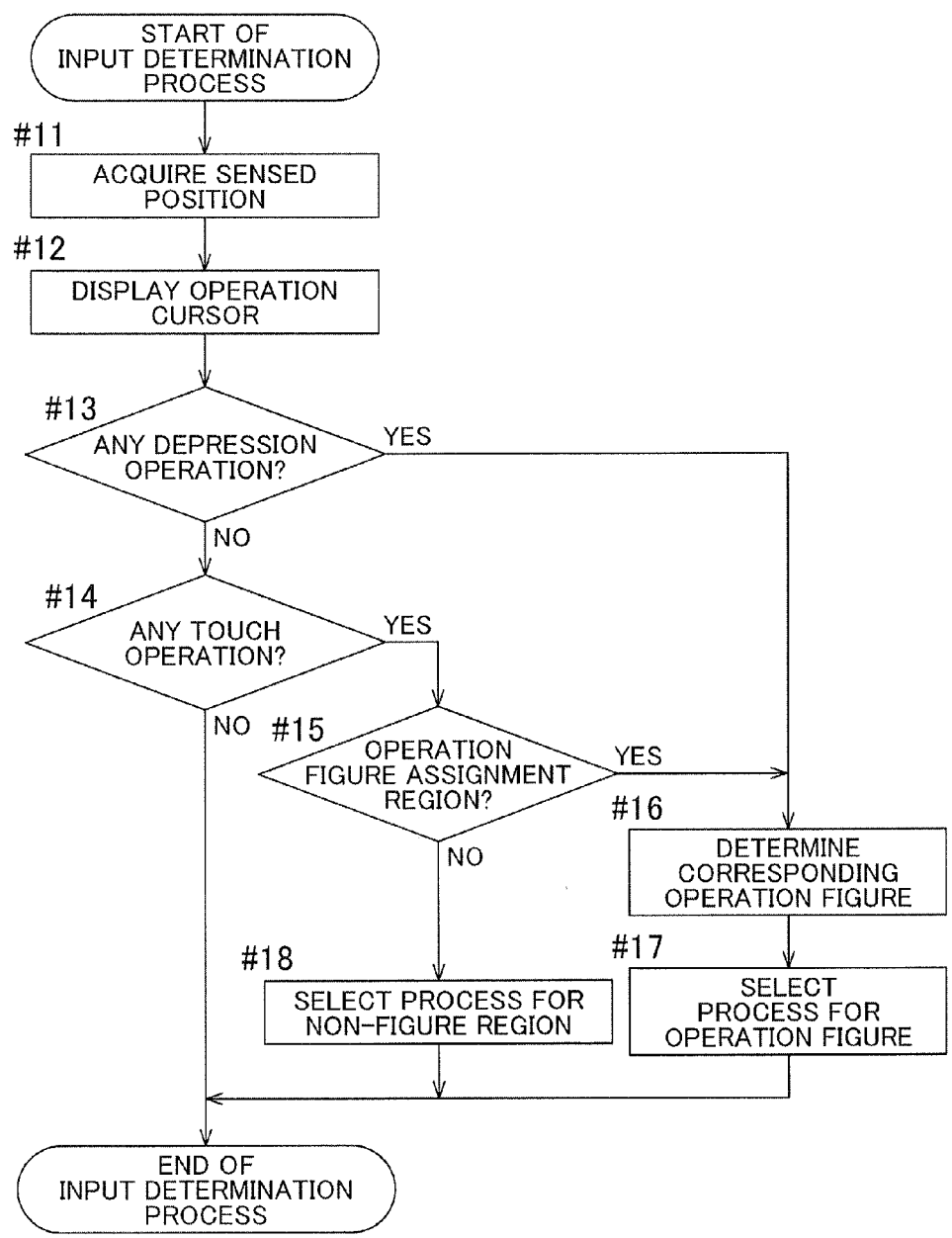
FIG. 10 is a flowchart showing the process procedures of an input determination process.

In the input determination process, as shown in FIG. 10, a sensed position of the object to be sensed D on the operation surface 11a is acquired (step #11). The operation cursor 45 is displayed at a position on the display screen 41 corresponding to the acquired sensed position (step #12). In the case where the sensed position of the object to be sensed D is moved on the operation surface 11a, the operation cursor 45 being displayed is also moved on the display screen 41 accordingly. After that, it is determined whether or not an operation (depression operation) is performed to forcibly transition the protrusion member 20 which has been in the protruded state into the retracted state (step #13). In the case where it is determined that such a depression operation is not performed (step #13: No), it is determined whether or not a touch operation (including a tap operation and a double-tap operation) is performed on the operation surface 11a (step #14). In the case where it is determined that such a touch operation is not performed (step #14: No), the input determination process is terminated.

In the case where a touch operation is sensed in step #14 (step #14: Yes), it is determined whether or not the position at which the touch operation is sensed falls within the operation figure assignment region I (step #15). In the case where it is determined that the sensed position falls within the operation figure assignment region I (step #15: Yes) or in the case where it is determined in step #13 that a depression operation for the protrusion member 20 has been sensed (step #13: Yes), the type of the operation figure 44 corresponding to the operation figure assignment region I or the protrusion member 20 which has been subjected to the depression operation is determined (step #16). Then, the operation figure 44 is selected, and the function associated with the operation figure 44 (such as a destination search function or an audio setting function, for example) is achieved (step #17). In this case, there may be a case where a plurality of operation figures 44 are selected and it is difficult to determine which operation figure 44 is selected. In such a case, the likelihood of the selection (the estimated degree of coincidence of the selection with the intention of the user) may be determined on the basis of at least one of the number of the protrusion members 20 which have been subjected to the depression operation and the sensed position of the object to be sensed D to decide the selected operation figure 44. After that, the input determination process is terminated. In the case where it is determined in step #15 that the sensed position does not fall within the operation figure assignment region I (step #15: No), a selection process is executed for a region (non-figure region) other than the operation figure assignment region I (step #18). For example, a process for scrolling a map image with the position at which the touch operation is sensed centered in the display screen 41 is executed. The input determination process is thus terminated.

When the input determination process is terminated, the process returns to FIG. 9, and it is determined whether or not the image displayed on the display screen 41 is changed (step #06). In the case where no depression operation or touch operation is sensed in the input determination process, a screen transition is not likely to be performed. In such a case (step #06: No), the input determination process is executed again. In the case where the operation figure 44 is selected as a result of the input determination process, a process for scrolling the map image is executed, or the like, meanwhile, a screen transition may be performed. In such a case (step #06: Yes), the operation input reception process is terminated. The processes in step #01 and the subsequent steps are executed again on the display image after the change. The processes described above are repeatedly successively executed.

5. Other Embodiments

Lastly, operation input devices according to other embodiments of the present invention will be described. A configuration disclosed in each of the following embodiments may be applied in combination with a configuration disclosed in any other embodiment unless any contradiction occurs.

(1) In the embodiment described above, the drive mechanism 30 brings the protrusion member 20 into one of the protruded state (a state in which the protrusion member 20 is at the maximally displaced position within its movable range) and the retracted state (a state in which the protrusion member 20 is at the minimally displaced position within its movable range). However, embodiments of the present invention are not limited thereto. That is, the drive mechanism 30 may be configured to bring the protrusion member 20 into an intermediate state between the protruded state and the retracted state. Such an intermediate state is also included in the "first state" according to the present invention. In this case, the protrusion control section 52 may be configured to control stepwise the position of the protrusion member 20 with respect to the operation surface 11a in the protrusion direction (advancing/retracting operation direction Z) so that the protrusion member 20 can be protruded stepwise.

(2) In the embodiment described above, the drive mechanism 30 includes the piezoelectric element 31, the slide mechanism 32, and the protrusion control section 52. However, embodiments of the present invention are not limited thereto. That is, the drive mechanism 30 may have any specific configuration as long as the drive mechanism 30 can cause advancing/retracting operation of the protrusion member 20 along the advancing/retracting operation direction Z to move the protrusion member 20 between the protruded state and the retracted state. For example, the drive mechanism 30 may utilize a fluid pressure such as a liquid pressure or a gas pressure, may utilize an electromagnetic force of an electromagnet, a solenoid, or the like, or may utilize power of a motor. In the case where the touch pad 10 of the capacitance type is provided and a motor, a solenoid, or the like is used as an actuator of the drive mechanism 30, for example, noise can be caused along with drive of the actuator to vary the capacitance. Thus, in such a case, a shield portion (such as an electromagnetic shield, for example) that blocks noise caused along with drive of the actuator is preferably provided.

(3) In the embodiment described above, the slide mechanism 32 forming the drive mechanism 30 includes the spring member 34 serving as the preliminary pressure application unit. However, embodiments of the present invention are not limited thereto. That is, the slide mechanism 32 may include a fluid pressure supply portion configured to supply a predetermined fluid pressure, for example, as the preliminary pressure application unit.

(4) In the embodiment described above, the operation plate 11 of the touch pad 10 is provided with a plurality of hole portions 12 and the same number of protrusion members 20. However, embodiments of the present invention are not limited thereto. That is, only one hole portion 12 and one protrusion member 20 may be provided. In this case, for example, the display position on the display screen 41 of the operation figure 44 that is frequently selected may be set to a fixed position, and the hole portion 12 and the protrusion member 20 may be provided at the position on the operation surface 11a corresponding to the operation figure 44. Alternatively, as shown in FIG. 11, for example, a multiplicity of hole portions 12 and protrusion members 20 may be arranged regularly over the entire operation surface 11a. In this case, a desired concave-convex shape can be expressed by the multiplicity of protrusion members 20 provided over the entire operation surface 11a so as to freely appear and disappear.

(5) In the embodiment described above, the protrusion member 20 is driven so as to be advanced and retracted along the advancing/retracting operation direction Z set to a direction orthogonally intersecting the operation surface 11a. However, embodiments of the present invention are not limited thereto. That is, the advancing/retracting operation direction Z may be set to a direction inclined with respect to, rather than orthogonally intersecting, the operation surface 11a. In this case, in the case where the touch pad 10 is disposed generally horizontally at the center console portion as in the embodiment described above, for example, the advancing/retracting operation direction Z is preferably set to be inclined toward a driver's seat.

(6) In the embodiment described above, the touch pad 10 of the capacitance type which can sense the object to be sensed D in contact with or in proximity to the operation surface 11a is used. However, embodiments of the present invention are not limited thereto. That is, the touch pad 10 of the resistance film type may also be utilized in place of the touch pad 10 of the capacitance type. Alternatively, the touch pad 10 of a pressure sensitive type which can sense the object to be sensed D in contact with the operation surface 11a may also be utilized.

(7) In the embodiment described above, the normal touch pad 10 is provided in the operation input device 4 to receive input corresponding to the sensed position of the object to be sensed D. However, embodiments of the present invention are not limited thereto. That is, a touch panel obtained as a combination of the touch pad 10 and a display device such as a liquid crystal panel may be provided in the operation input device 4 described in relation to the embodiment described above. In this case, the display device may be integrated on the back surface side of the transparent touch pad 10. In such an operation input device 4, the protrusion members 20 are preferably controlled so as to be advanced and retracted in accordance with one or both of the positions and the contents of operation figures such as operation icons displayed on the display device of the touch panel, for example. Also according to such an operation input device, as with the embodiment described above, it is possible to provide an operation feeling that utilizes tactile sensation without impairing the operation feeling of the touch panel.

(8) In the embodiment described above, the operation figure 44 being displayed is expressed by a pair of (two) protrusion members 20 in the form of two protrusion portions arranged side by side. However, embodiments of the present invention are not limited thereto. That is, the operation figure 44 may be simply expressed by one protrusion member 20 in the form of a single protrusion portion. Alternatively, the operation figure 44 may be expressed by three or more protrusion members 20 in the form of a group of protrusion portions that assumes a predetermined shape as a whole.

(9) In the embodiment described above, the operation input device 4 is communicably connected to the display input device 40 formed by integrating a display device and an input device such as a touch panel. However, embodiments of the present invention are not limited thereto. That is, the presence of a touch panel (the first operation input unit in the embodiment described above) is not essential, and it is only necessary that the operation input device 4 should be connected to at least a display device including a display screen. The operation input device 4 may not necessarily be connected to the display input device 40 or the display device, depending on the device to which operation input is performed. The operation input device 4 according to the embodiment allows to perform reliable operation input compared to the related art without seeing a screen displaying images at all.

(10) In the embodiment described above, the state sensing section 56 is configured to sense the actual protrusion status of each protrusion member 20 on the basis of information acquired from a position sensor. However, embodiments of the present invention are not limited thereto. For example, the state sensing section 56 may be formed using the piezoelectric element 31 provided in the drive mechanism 30 as a sensor element, by utilizing the characteristics of the piezoelectric element 31. As discussed above, when the protrusion control section 52 drives the protrusion member 20 so as to be advanced and retracted, application of a voltage is stopped after a predetermined time elapses. Therefore, providing a configuration that enables to sense an external force (a depressing force provided by the user) applied to the piezoelectric element 31 via the protrusion member 20 and the coupling member 33 as an electric signal after the stop of the voltage application may achieve a configuration that enables to sense an operation (depression operation) for the protrusion member 20 performed by the user. Then, the state sensing section 56 may sense the actual protrusion status of each protrusion member 20 on the basis of the sensed depression operation and the protrusion status of each protrusion member 20 determined by the status determination section 51. That is, in the case where an electric signal from the piezoelectric element 31 corresponding to the protrusion member 20 in the protruded state is sensed, the state sensing section 56 determines that the protrusion member 20 has been brought into the retracted state. Meanwhile, in the case where a lapse of the predetermined time is detected by a timer or the like after the piezoelectric element 31 corresponding to the protrusion member 20 in the retracted state is vibrated, the state sensing section 56 determines that the protrusion member 20 has been brought into the protruded state.

(11) In the embodiment described above, the operation input computation section 50 includes the state sensing section 56 and the input reception section 57. However, embodiments of the present invention are not limited thereto. That is, the state sensing section 56 and the input reception section 57 are functional sections configured to assistively help the position sensing section 53 and the select operation determination section 55 cooperate with each other to determine whether or not a select operation is performed (see FIG. 10), and are not necessarily provided in the operation input computation section 50.

(12) In the embodiment described above, the operation input computation section 50 includes the functional sections 51 to 57. However, embodiments of the present invention are not limited thereto. That is, the assignment of the functional sections described in relation to the embodiment described above is merely illustrative, and a plurality of functional sections may be combined with each other, or a single functional section may be further divided into sub-sections.

(13) In the embodiment described above, the operation input device 4 allows to perform operation input to the in-vehicle navigation apparatus 1. However, embodiments of the present invention are not limited thereto. That is, the operation input device according to the present invention may allow to perform operation input to a navigation system in which the components of the navigation apparatus 1 described in the embodiment described above are distributed to a server device and an in-vehicle terminal device, a laptop personal computer, a gaming device, and other systems and devices such as control devices for various machines, for example.

(14) Also regarding other configurations, the embodiment disclosed herein is illustrative in all respects, and the present invention is not limited thereto. That is, a configuration not described in the claims of the present invention may be altered without departing from the various aspects of the present invention.

The present invention may be suitably applied to an operation input device including a touch pad serving as a pointing device.

What is claimed is:

1. An operation input device comprising:
   a touch pad that includes an operation plate on a surface of which an operation surface is formed and is configured to sense an object in contact with or in proximity to the operation surface to receive input corresponding to a position of the sensed object;
   a hole portion provided to penetrate through the operation plate;
   a protrusion member inserted into the hole portion; and
   a drive mechanism provided on a back surface side of the operation plate and configured to cause an advancing/retracting operation of the protrusion member along a direction intersecting the operation surface between a first state in which a distal end portion of the protrusion member is above the operation surface and a second state in which the distal end portion is not above the operation surface,
   wherein the drive mechanism includes a piezoelectric element configured to vibrate in an advancing/retracting operation direction of the protrusion member, a slide mechanism that enables the piezoelectric element or a member that vibrates together with the piezoelectric element and the protrusion member to slide with respect to each other with a predetermined friction force caused between the piezoelectric element or the member that vibrates together with the piezoelectric element and the protrusion member, and a vibration control section capable of adjusting a difference between a speed of vibration of the piezoelectric element to one side along the advancing/retracting operation direction and a speed of vibration of the piezoelectric element to the other side.

2. The operation input device according to claim 1, wherein:
- the touch pad is a touch pad of a capacitance type and includes wiring members disposed in a grid along the operation surface; and
- the hole portion is provided so as to avoid the wiring members.

3. The operation input device according to claim 1, wherein the drive mechanism includes a piezoelectric element that drives the protrusion member.

4. The operation input device according to claim 1, wherein a plurality of the hole portions are provided, and the protrusion member is inserted into each of the hole portions.

5. The operation input device according to claim 1, further comprising:
- a state sensing section that senses the first state and the second state of the protrusion member.

6. The operation input device according to claim 1, wherein:
- the operation input device is communicably connected to a display device that includes a display screen and displays an image on the display screen; and
- coordinates of the display screen and coordinates of the operation surface are correlated with each other.

* * * * *